(No Model.)
J. C. KELLY.
MACHINE FOR MAKING TOE CALKS.
No. 374,681. Patented Dec. 13, 1887.
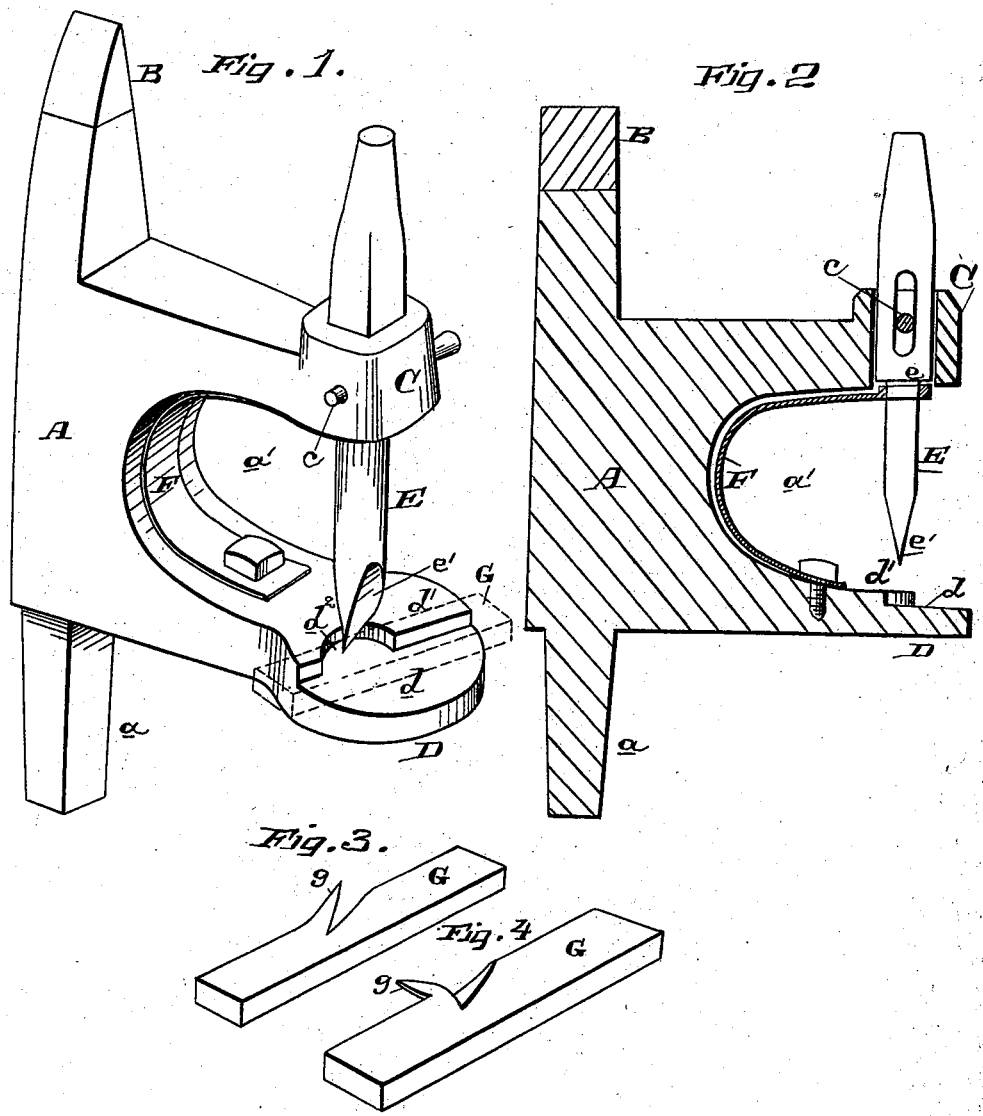

UNITED STATES PATENT OFFICE.

JOHN C. KELLY, OF AUSTIN, NEVADA.

MACHINE FOR MAKING TOE-CALKS.

SPECIFICATION forming part of Letters Patent No. 374,681, dated December 13, 1887.

Application filed August 24, 1887. Serial No. 217,793. (No model.)

*To all whom it may concern:*

Be it known that I, JOHN C. KELLY, of Austin, Lander county, State of Nevada, have invented an Improvement in Machines for Making Toe-Calks; and I hereby declare the following to be a full, clear, and exact description of the same.

My invention relates to the class of calk-making machines; and my invention consists, essentially, in a movable chisel or cutter and an underlying table or anvil provided with a depressed portion, and an elevated portion forming a shoulder extending obliquely and at an angle with the cutting-edge of the chisel or cutter.

My invention further consists in forming in the shoulder made by the elevated portion a recess to permit the calk to be driven out from the edge of the work, and in details of construction, all of which I shall hereinafter more fully describe.

The object of my invention is to provide a simple and rapidly-operating machine for making toe-calks.

Referring to the accompanying drawings for a more complete explanation of my invention, Figure 1 is a perspective view of my machine. Fig. 2 is a longitudinal section of same. Figs. 3 and 4 show the calks.

A is the stock or frame of the machine, having a shank, $a$, whereby it may be fitted to the hardy-hole of an anvil. Rising from the back top of the stock is a stem, to which is secured a hardy, B, though said hardy may be arranged and fitted in any other manner—as, for example, by making a hole in the stock and fitting it thereto after the manner of an ordinary hardy. The front of the stock is recessed at $a'$ to form the socketed seat C for the chisel or cutter and the underlying table or anvil D for the work. The chisel or cutter E passes vertically through the socketed seat, and is slotted over a pin, $c$, which serves to guide it in its movements and to prevent it from springing out of place after the delivery of the blow. A spring, F, is secured in the recess $a'$ of the stock, and its upper end embraces the chisel or cutter E just under a shoulder, $e$, formed thereon. This spring throws the cutter up after the blow has been delivered. The lower end or bit, $e'$, of the chisel or cutter is beveled off on each side to a wedge shape.

The table or anvil D is formed with a depressed portion, $d$, and an elevated portion, $d'$, the shoulder thus made being diagonal and inclined at an angle of forty-five degrees, approximately, to the line of the bit of the cutter. In the elevated portion of the table or anvil is formed a curved recess, $d^2$, which begins at a point about in the vertical plane of the farther edge of the bit.

In order to understand the operation of the machine, I have shown in dotted lines in Fig. 1 a piece of metal, G, in position, and in which the calk is to be made. It will be seen that it lies upon the depressed portion of the table or anvil, with its edge close up against the elevated portion. Before being so placed it is properly heated, and when in position the chisel or cutter is struck a blow upon its head, which drives it down upon the steel piece and makes an incision in its edge, which has the effect of forcing out therefrom, as shown in Fig. 3, a tongue-like piece, $g$, which is to form the calk. The curved recess $d^2$ in the elevated portion of the table or anvil permits this piece $g$ to be forced outwardly from the edge of the steel.

The steel piece may have as many calks formed in it as desirable, and the calks are then squared up on the hardy, as shown in Fig. 4, and the piece cut off into suitable lengths for welding onto the shoe.

Having thus described my invention, what I claim as new, and desire to secure by Letters Patent, is—

1. In a calk-making machine, the combination of a chisel or cutter with an underlying table or anvil formed with a depressed portion on which the work rests, and an elevated portion forming a shoulder against which the work bears, said shoulder being at an angle with the line of the cutting-edge of the chisel, substantially as herein described.

2. In a calk-making machine, the combination of a chisel or cutter and an underlying table or anvil formed with a depressed portion on which the work rests, and an elevated portion forming a shoulder against which the work bears, said shoulder being at an angle with the line of the cutting-edge of the chisel, and having a recess made in it, substantially as herein described.

3. In a calk-making machine, a stock or frame having a recessed front, forming a socketed seat for the chisel or cutter, and an underlying table or anvil with a depressed portion, and an elevated portion forming an obliquely-directed shoulder, in combination with a spring-controlled chisel or cutter seated in the socket of the stock and having its cutting-edge at an angle with the shoulder in the table or anvil below, substantially as herein described.

4. In a calk-making machine, a stock or frame having a recessed front, forming a socketed seat for the chisel or cutter, and an underlying table or anvil with a depressed portion, and an elevated portion forming an obliquely-directed shoulder, and provided with a recess, in combination with a spring-controlled chisel or cutter seated in the socket of the stock and having its cutting-edge at an angle with the shoulder in the table or anvil below, substantially as herein described.

5. A calk-making machine consisting of a stock or frame having a recessed front, a socketed seat for the chisel or cutter, and a pin passing through said seat, and a table or anvil with a depressed portion and a recessed inclined or oblique elevated portion, a chisel or cutter in the socketed seat of the stock and slotted over its pin, said chisel or cutter having its edge at an angle with the elevated portion of the table or anvil, and a spring seated in the recessed front of the stock and connected with the chisel or cutter, substantially as herein described.

In witness whereof I have hereunto set my hand.

JOHN C. KELLY.

Witnesses:
A. B. HASTINGS,
F. P. VAN PATTEN.